United States Patent [19]

Gutman et al.

[11] Patent Number: 4,926,460
[45] Date of Patent: May 15, 1990

[54] UNIVERSAL PSTN PAGE ENTRY PROTOCOL

[75] Inventors: Jose Gutman, Boynton Beach; Steven J. Goldberg, Coral Springs; Linda M. Trine, Boynton Beach, all of Fla.

[73] Assignee: Motorola, Inc., Schaumburg, Ill.

[21] Appl. No.: 249,015

[22] Filed: Sep. 26, 1988

[51] Int. Cl.$^5$ .................... H04M 1/64; H04M 11/00
[52] U.S. Cl. .................... 379/57; 340/825.48; 379/88; 379/98
[58] Field of Search .................... 379/57, 67, 88, 97, 379/98; 340/825.48, 825.44

[56] References Cited

U.S. PATENT DOCUMENTS 4,600,922  7/1986  Dunkerton et al. .................... 379/57

FOREIGN PATENT DOCUMENTS 0087666  6/1982  Japan .................... 379/97
2105950  3/1983  United Kingdom .................... 379/98

Primary Examiner—Thomas W. Brown
Attorney, Agent, or Firm—Donald B. Southard

[57] ABSTRACT

A universal PSTN page entry protocol method and arrangement is disclosed whereby any type of incoming call may be accommodated at a single telephone input, be it a call from a standard telephone set or from a computer/VDT or PET terminal device. This permits an originating call to any type of pager whether tone-only, tone and voice, numeric and/or alphanumeric pagers.

12 Claims, 4 Drawing Sheets

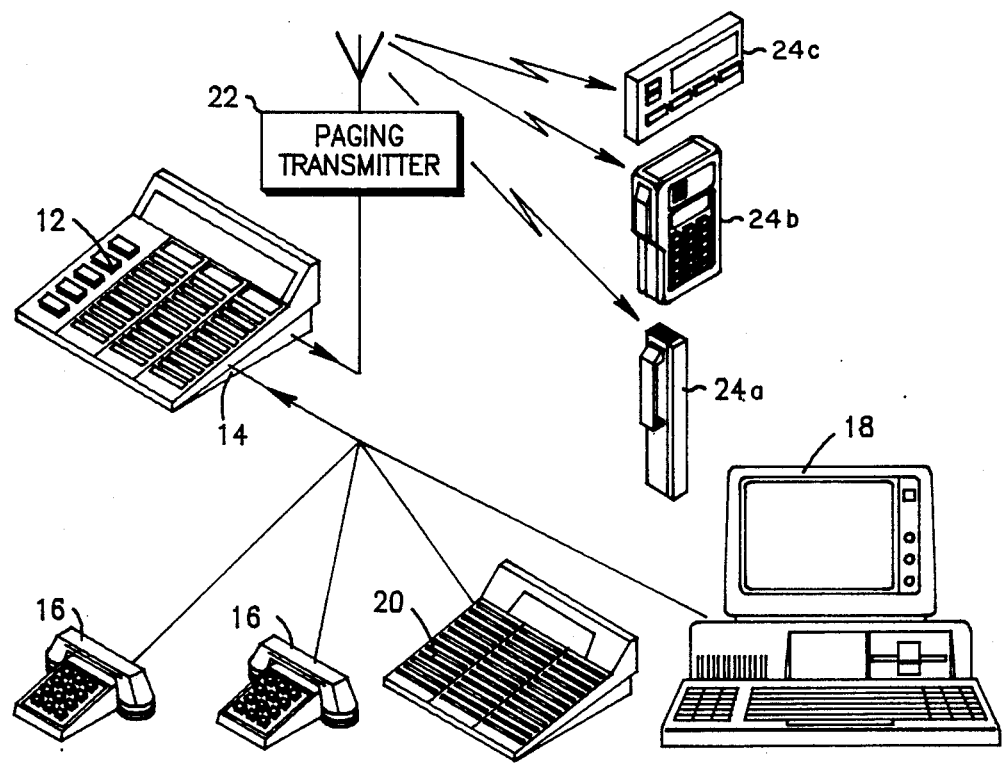
FIG. 1
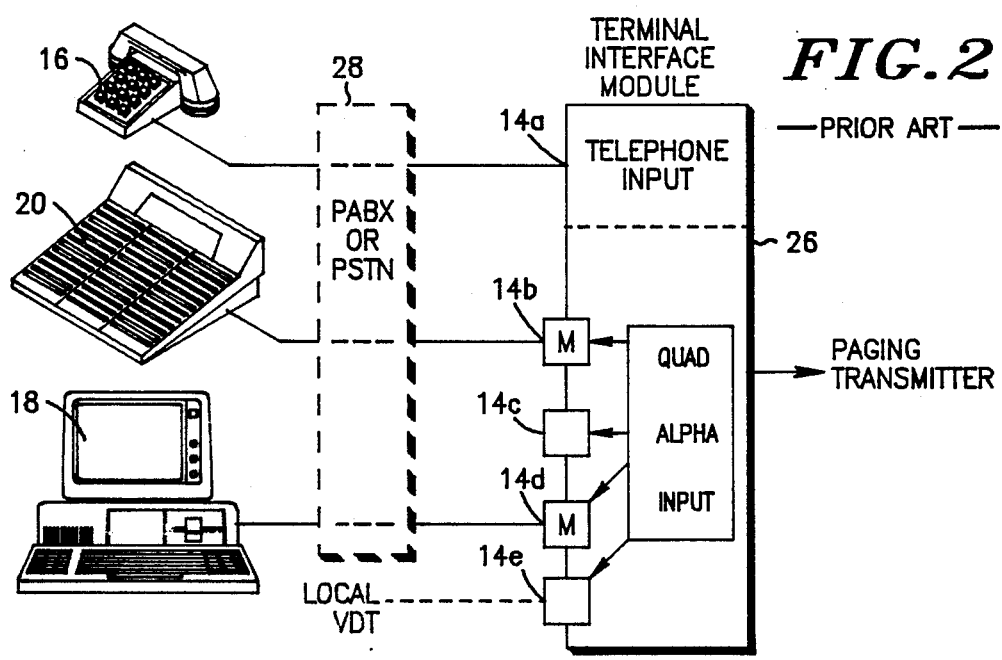
FIG. 2 — PRIOR ART —

UNIVERSAL PSTN PAGE ENTRY PROTOCOL

BACKGROUND OF THE INVENTION

This invention relates generally to paging systems and in particular to a universal PSTN page entry protocol arrangement wherein each of the telephone inputs of an associated paging terminal may accommodate a telephone device or alternatively a computer or paging terminal as desired.

Paging systems typically in the past have comprised a paging terminal which controls a paging transmitter for broadcasting paging signals to a number of associated radio pagers. Each of the pagers include a unique paging address so that the system's pagers may be selectably addressed. This requires the appropriate encoding of the paging signal before broadcasting which customarily is effected within the paging terminal itself. A memory holds the appropriate addresses of each of the pagers within the system which may be extracted as needed. Until recently, users wishing to initiate a "page" to a radio pager wearer needed only to call the terminal over a telephone, public or private, and request such pager, usually identified by a page number. The unit to be called could be either tone only or tone and voice. In any event, the calling device from the caller to the paging terminal was by telephone line over a conventional telephone set.

With the advent of the numeric and alphanumeric display pagers, however, a simple telephone call is not always sufficient. Today's paging terminals must be compatible with two distinct and separate classes of callers, i.e., human callers and mechanical (computer/terminal) callers.

Until now the paging terminal included separate cards or modules to accommodate the various paging callers. For human callers using a conventional telephone, a telephone input is included in the associated paging terminal apparatus wherein an included DTMF detector is provided for accepting and processing dialed-in digits. For computer/terminals, a dedicated telephone input must be provided which further includes a modem. Accordingly, there are two separate and distinct cards or modules that heretofore must have been provided in the paging terminal. Consequently, there could well be an under-utilization for one type of caller while effecting an overloading regarding the other type, with no clear cut efficient way of addressing such undesired unbalance.

SUMMARY OF THE INVENTION

Accordingly, it is an object of the present invention to provide a paging terminal arrangement which overcomes the foregoing deficiencies.

A more particular object of the present invention is to provide a paging terminal arrangement wherein both human callers as well as computer/VDT or PET terminal callers may utilize any telephone input of a paging terminal without further modification.

In practicing the invention, paging terminal apparatus is provided which includes a predetermined protocol and at least one telephone input. The paging terminal apparatus further includes a DTMF detector and a modem. Means are further included for determining the identity of any particular call whether human or computer/VDT or PET terminal, after which such caller is accommodated by the associated protocol.

BRIEF DESCRIPTION OF THE DRAWINGS

The features of the present invention which are believed to be novel are set forth with particularity in the appended claims. The invention, itself, however together with further objects and advantages thereof may be best understood by reference to the accompanying drawings, in which:

FIG. 1 is a diagram representative of a typical paging system and its more basic component parts;

FIG. 2 is a graphic representation of the terminal interface of the paging console with the paging input devices operating through a PBX or PSTN;

BRIEF DESCRIPTION OF THE PREFERRED EMBODIMENT

Figure 3:
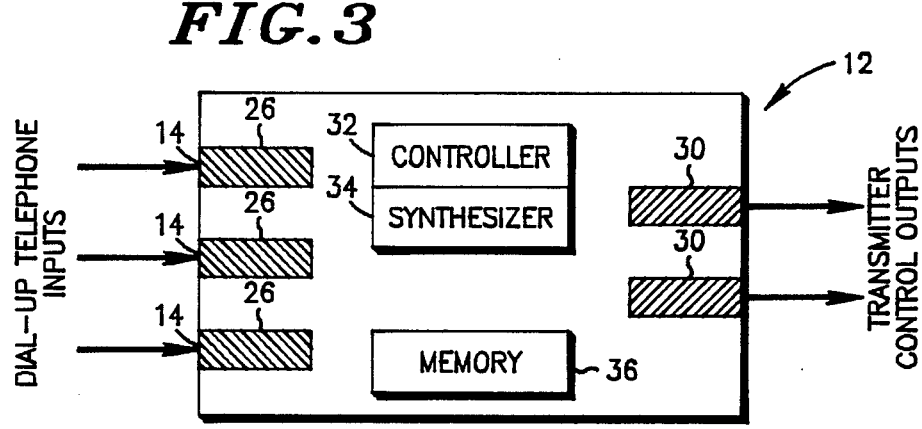
FIG. 3 is a graphic representation of a typical paging console with its constitute parts which console terminal has been constructed in accordance with the present invention.

Referring now to the drawings, a typical paging system is shown in FIG. 1 at reference 10. System 10 may include a paging controller/console 12 which receives incoming calls at a telephone input port 14 from, first, human callers utilizing conventional or standard telephone set 16, secondly from personal computers or video display terminals (VDTs) depicted at 18, and, thirdly, from page entry terminals (PETs) as shown at 20. Console 12 then processes the paging request, extracts the appropriate address from internal memory and activates the paging transmitter 22 to broadcast the intended paging signal. The paging call is received by the appropriate system pager and processes the information and then renders an alert to the paging receiver wearer or user. As will be understood, the pagers of the system may be of a tone-only type, as depicted at 24a, a numeric display type, as indicated at 26b, or an alphanumeric display type, as shown at 28c.

As illustrated in FIG. 2, a terminal interface module 26 accepts the incoming calls from a PABX or a Public Switched Telephone Network (PSTN) shown in dotted line at 28, which in turn interfaces with a standard telephone device 16, a personal computer or video display terminal (VDT) 18 or a page entry terminal (PET) 20. While the telephone input 14 in FIG. 1 is illustrated as a single input port, in actuality it may well be multiple ports to accommodate the various callers, human or machine.

As is well known in the past, the conventional telephone has heretofore required a dedicated input, at the console interface module 26, such as shown at 14a, which includes a DTMF detector (not shown). At the same time, an incoming call from a PET or personal computer requires a MODEM internal to the console interface module to effectively communicate with the modem included in the PET or personal computer. This is indicated at inputs 14b and 14d by the reference symbol "M". Still other inputs, such as 14c and 14e, may also be included as well.

Accordingly, it will be appreciated then that prior systems were capable and did indeed service either human callers or calls from a remote computer/terminal device, but not both from the same input board. This is indicated by the dashed line separating the telephone input at the top in FIG. 2 in the interface module 26 from the quad-alpha input board at the bottom of the diagram. The present invention, however, efficiently and effectively corrects this deficiency whereby each input at the terminal interface module may accommodate any incoming paging call whether from a standard telephone set or one from a computer/terminal device.

Before describing the specifics of the present invention, it is useful to consider the basic component parts of the paging console such as depicted at 12 in FIG. 1. As shown in FIG. 3, such console includes one or more dial-up telephone inputs, each of which requires one input board. One or more transmitter control outputs are provided, each of which usually requires a corresponding control board (TCU) 30. Paging console 12 further includes a controller 32, synthesizer 34, and memory 36. These component parts essentially route incoming paging requests from the input side of the console to the output side of the system. The controller 32 serves as the "brain" of the system while the synthesizer board generates the paging tones constituting the selected pager's address contained within the memory 36 along with other system parameters and subscriber information.

Figure 4:
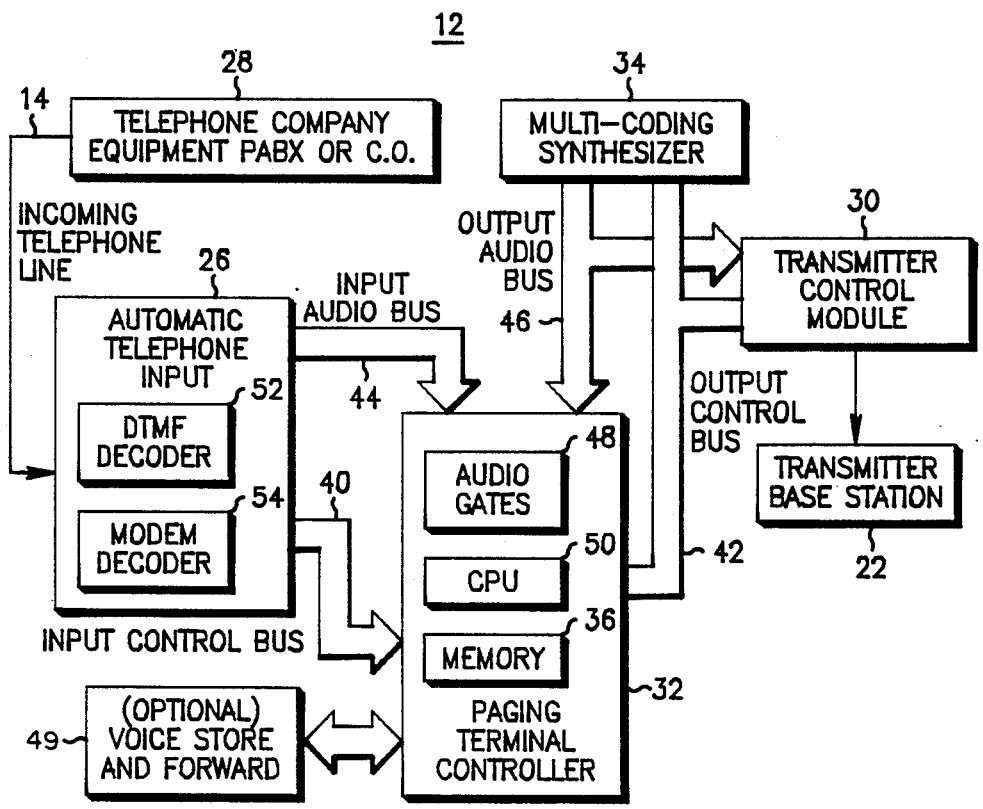
FIG. 4 is a block diagram of the paging console and interconnecting internal busses of FIG. 3 but shown in more detail.

A more detailed block diagram of the paging console 12 is shown in FIG. 4, which console has been constructed in accordance with the present invention. In the block diagram of FIG. 4, the various busses interconnected internal of the console 12 are shown in specific detail which are not illustrated in the more generalized representation of FIG. 3. As shown, there is a digital input control bus 40 and an output digital control bus 42, both of which are utilized to control the input and output boards 26 and 30. There is also an input audio bus 44 and a corresponding output bus 46 for routing the incoming audio, when present, to the output side. As will be noted the audio is routed through audio gates 48. As previously described, synthesizer 34 provides the appropriate coding, such as audio tones, forming the pager address after extraction from memory 36. An optional voice store and forward circuit board 49 may be provided to accept audio and store the same for later retrieval and routing to the output side of the system. All of this is controlled by the paging console controller 32 which includes as its main control element, a CPU 50.

It is to be noted that, as a significant aspect of the present invention, both a DTMF decoder 52 and a modem decoder 54 are included in each telephone input board 26. In this manner, all variety of incoming calls may be accommodated by each telephone input board 26 without further modification. To implement and effect this universality, the incoming call needs only to be identified as to type and treated in accordance with further predetermined processing protocol. This will be either a protocol to process incoming calls by a human caller utilizing a standard telephone set having DTMF tone capability (hereinafter referred to as "Voice based" or "human/DTMF" protocol) or, alternatively, a protocol to process incoming calls from a machine such as a paging entry terminal (PET) or computer/video display terminal device (hereinafter "machine based" or "Computer/Modem" protocol). This identification and control is effected by the CPU Unit 50 in accordance with the procedural protocol as depicted in FIGS. 5 and 6.

Figure 5:
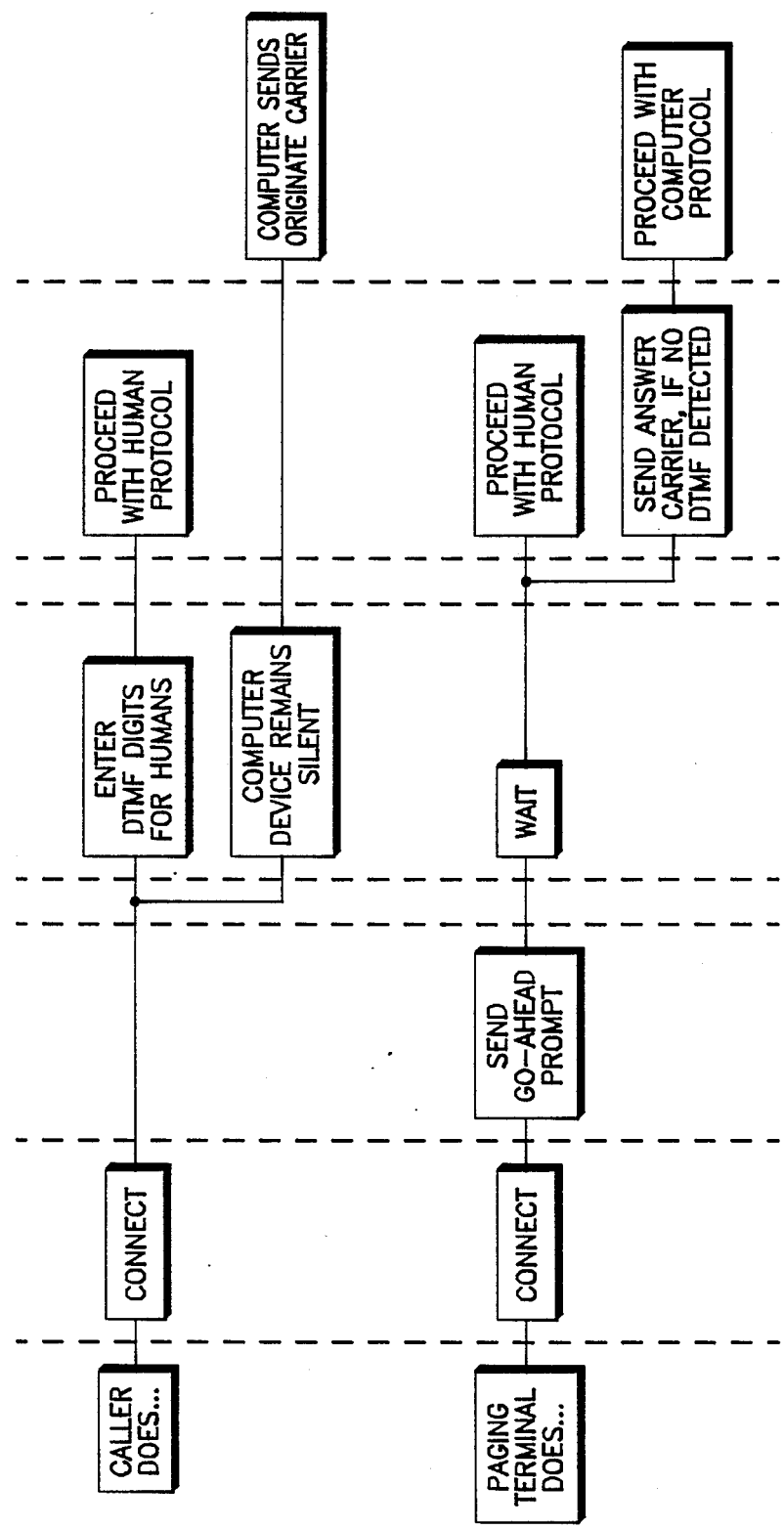
FIG. 5 is a representation of the page entry protocol of the caller requesting the page and the response by the paging console which operates in accordance with the present invention.

In FIG. 5, a descriptional outline is provided for both types of callers, human or computer/VDT or PET terminal, and the action of the paging console 12 in response thereto. As depicted, when either type of caller sends a paging call to the paging console, the console connects to the calling device and sends a go-ahead prompt. This may comprise a tone of short duration of, say, one second. If a synthesized voice is utilized, a prompt such as "Enter Page Number" guides the caller. At that juncture, the console simply waits a predetermined time period during which the type of caller is to be determined. Typically, this period can be approximately five seconds or less. If the caller is a human using a conventional telephone set, DTMF digits will commence to be entered by the action of such user pressing the telephone key pads. If, on the other hand, the call is from a computer or terminal device, there will be no DTMF digits generated and such calling device simply remains silent during this time waiting for an answer carrier to be generated by the console.

In this way, the paging console 12 determines the type of caller and proceeds accordingly. If the caller is human and DTMF digits are generated and detected, paging console 12 proceeds with the established human protocol. If the caller is machine based, no DTMF digits will be generated and after the predetermined wait period, the paging console determines that it is a computing or terminal device that is making the call. Accordingly, the console sends an answer carrier and then proceeds with the required and preestablished computer or machine protocol.

Figure 6:
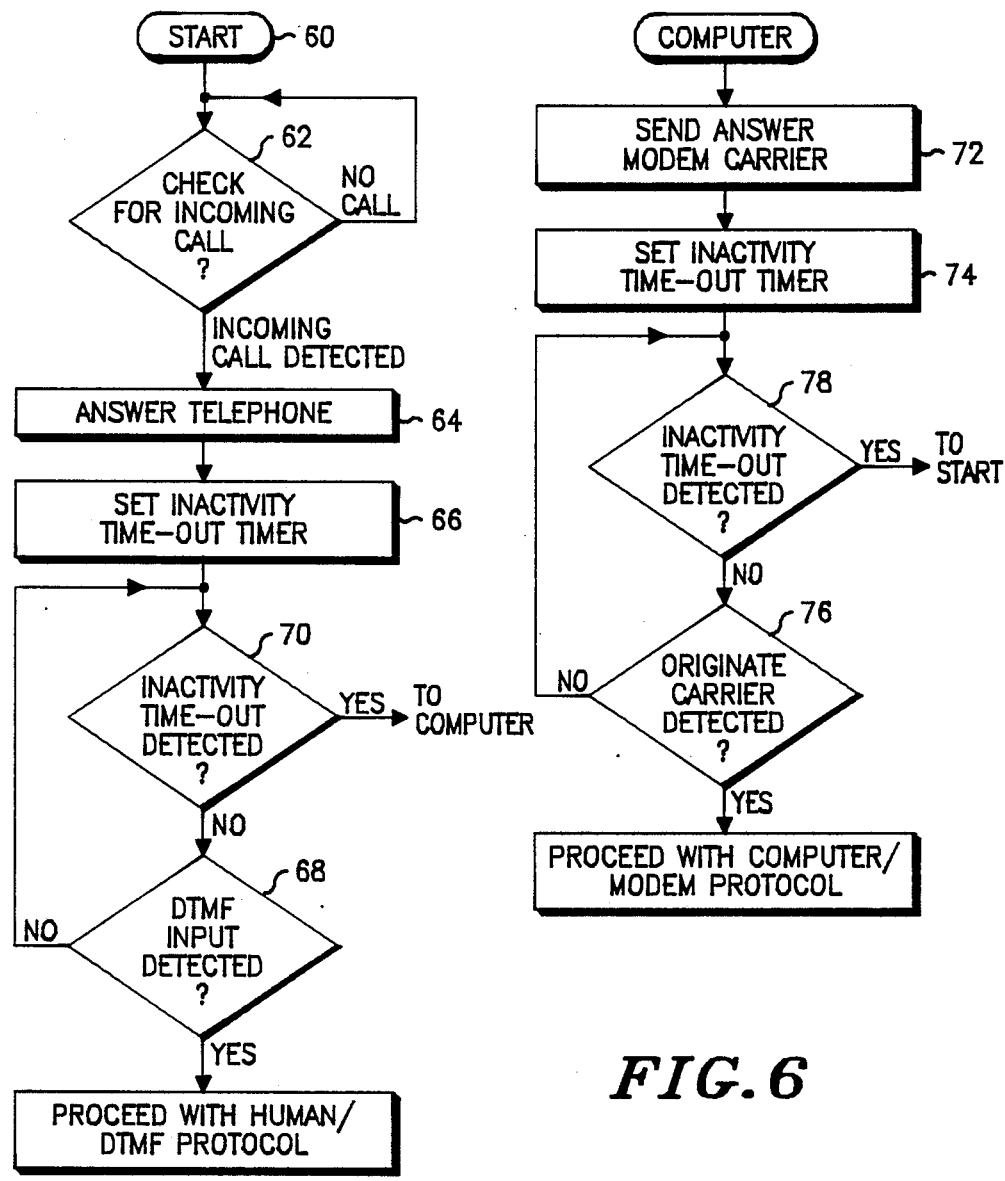
FIG. 6 is a flow chart showing step by step the protocol for effecting the advantages of the present invention.

The formalized procedure for accomplishing the foregoing is effected by the CPU 50 of controller 32 and is depicted in sufficient detail for those skilled in the art by the flow chart of FIG. 6. As indicated, the procedure begins at the initial start condition or mode, indicated at 60, wherein the console controller 32 begins to check for any incoming calls represented at step 62. When one is in fact detected, it is answered (connected) at step 64, at which time an inactivity time-out timer, provided as a functional aspect by the CPU 50, is set at step 66. This establishes a predetermined period of time as previously referenced. If DTMF signals representing digits are detected during this time period, the CPU 50 knows it is a human caller and proceeds with predetermined and preestablished human/DTMF protocol.

If, however, no activity is detected during the set time period, as indicated at step 70, the CPU 50 of control 32 determines the call is originating from a machine computer/terminal source and sends an "answer modem carrier" as indicated at step 72. At the same time, an additional inactivity time out timer, again provided as a functional aspect by the CPU 50, is set for a predetermined time period at step 74. If during this time period an originate carrier is detected from the initiating computer or terminal at step 76, the controller 32 will then proceed with predetermined and preestablished computer/modem protocol to further process the pending paging call. On the other hand, if the originate carrier is not detected during this time period, as indicated at step 78, the CPU 50 of controller 32 terminates the ongoing procedure and reverts back to the start-up mode at step 60.

Accordingly, the universal PSTN page entry protocol arrangement has been shown and described herein whereby each and every telephone input of a paging console may accommodate a conventional telephone set operated by a human caller as well as those calls initiated by way of a machine source, such as a computer or page entry terminal required for numeric and alphanumeric messages intended for like pagers. By determining the type of caller, the paging console can and does proceed with the appropriate predetermined and preestablished processing protocol. System component parts are thereby reduced, reliability is significantly increased and user convenience effectively enhanced.

Accordingly, what is claimed is:

1. Paging terminal apparatus with predetermined voice and machine based protocols and at least one telephone input for accommodating calls from standard telephone sets as well as calls from computer/VDT or paging entry terminal (PET) devices, comprising in combination:

paging terminal interface means having said at least one telephone input, DTMF detector and a modem;

control means for determining if any particular call is from a standard telephone set or a computer/VDT or PET terminal device;

said control means further including an inactivity time-out timer, means for setting said timer upon receiving an incoming call, and means for determining whether DTMF signals are received during the interval said inactivity timer is set; and means for accommodating said particular type of call after determining the identity thereof and running either the voice or machine based protocol.

2. Paging terminal apparatus in accordance with claim 1 wherein said control means determines an incoming call is from a standard telephone set if DTMF signals are received during the interval when said inactivity time-out timer is set thereby activating said accommodating means to proceed with the voice based protocol.

3. Paging terminal apparatus in accordance with claim 1 wherein said control means determines an incoming call is from a computer or VDT/PET terminal if no DTMF signals are received during the interval when said inactivity time out time is set thereby activating said accommodating means to proceed with the machine based protocol.

4. Paging terminal apparatus in accordance with claim 2 wherein an incoming call to said paging terminal apparatus is routed through a PABX or a public switched telephone network.

5. Paging terminal apparatus in accordance with claim 2 wherein an incoming call includes either an alphanumeric message from a personal computer, a page entry terminal, or a video display terminal, a numeric message from a telephone set with DTMF signal generation capability, or a tone-only and/or voice message from a standard telephone set.

6. Paging terminal apparatus in accordance with claim 2 wherein said control means includes voice and storage means for accepting audio from an incoming call for storage and later retrieval by said control means.

7. A method for accommodating calls from standard telephone sets as well as those from computer/VDT or page entry terminal (PET) devices by a paging terminal having at least one telephone input and predetermined voice and machine based protocols comprising the steps of:

providing paging terminal interface means having said at least one telephone input, a DTMF detector and a modem;

determining if any particular call is from a standard telephone set or a computer/VDT or PET terminal device;

the step of call determination further including setting an included inactivity time-out timer upon receiving an incoming call and determining whether DTMF signals are received during the interval the inactive time is set; and processing such particular call with the running of appropriate predetermined voice or machine based protocol in accordance with the type of the call after said determination of same.

8. A method for accommodating paging calls in accordance with claim 7 wherein determining if an incoming call is from a standard telephone set includes the further step of determining if DTMF signals are received during the interval when said inactivity time-out time is set and if so then activating said accommodating means to proceed with the voice based protocol.

9. A method for accommodating paging calls in accordance with claim 7 wherein determining if an incoming call is from a computer or terminal includes the further step of determining if not DTMF signals are received during the interval when said inactivity time-out time is set and if so then activating said accommodating means to proceed with the machine based protocol.

10. A method for accommodating paging calls in accordance with claim 7 wherein an incoming call to said paging terminal apparatus is routed through a PABX or a public switched telephone network.

11. A method for accommodating paging calls in accordance with claim 7 wherein an incoming call includes either an alphanumeric message from a personal computer, a page entry terminal, or a video display terminal, a numeric message from a telephone set with DTMF signal generation capability, or a tone-only and/or voice message from any standard telephone set.

12. A method for accommodating paging calls in accordance with claim 7 wherein an optional step is effected of first accepting audio from an incoming call for storage and later retrieval.

* * * * *